Treadwell & McCollum,
Cracker Machine,

No. 25,775.

Patented Oct. 11, 1859.

UNITED STATES PATENT OFFICE.

F. C. TREADWELL, JR., OF NEW YORK, N. Y., AND H. McCOLLUM, OF WINDHAM, CONNECTICUT.

MODE OF MAKING CYLINDRICAL STRIPS OF DOUGH IN THE MANUFACTURE OF CRACKERS.

Specification of Letters Patent No. 25,775, dated October 11, 1859.

*To all whom it may concern:*

Be it known that we, FRANCIS C. TREADWELL, Jr., of the city and county of New York and State of New York, and HENRY McCOLLUM, formerly of the city of New York, but now residing in Windham, Windham county, State of Connecticut, have jointly and together made a new and useful Improvement in the Method of Forming Cylindrical Strips from a Sheet of Previously-Rolled Dough Suitable for Molding into Crackers; and we hereby declare that the following is a full, clear, and exact description thereof.

Our improvement in the method of forming cylindrical strips suitable to be thereafter divided and molded into crackers consists in a peculiar way of operating upon a sheet of smooth rolled or "skin covered" dough by which we form it into cylindrical strips that are "skin covered" and the skin pressed down and firmly united at the sides of the strips.

We effect this by passing the sheet of smoothly and evenly rolled dough between a pair of matched grooved rollers constructed with portions of the plane surface between each groove. But more particularly to describe the construction of the grooved rollers we will refer to the annexed drawings forming a part of this specification in which—

Figure 2:
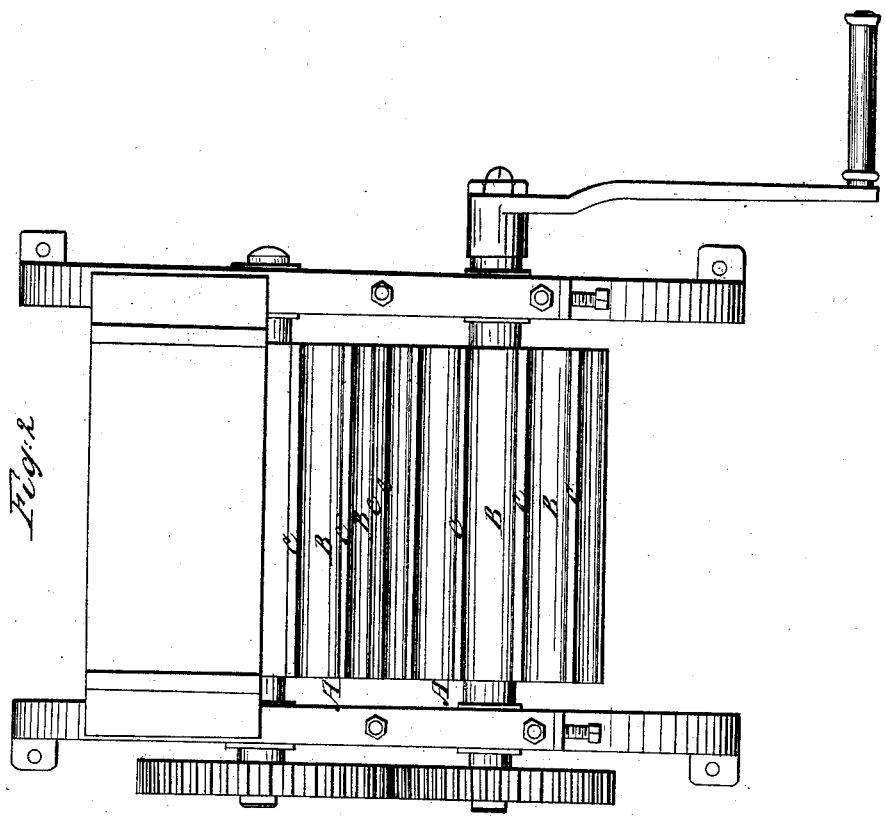
Figure 1:
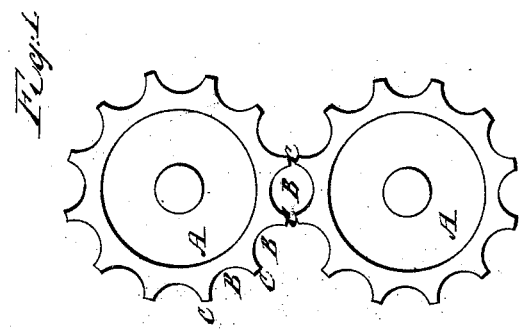

Figure 1 represents a transverse section of a pair of grooved rollers with feeding table and Fig. 2 a plan view of the same.

Letter A, A are two longitudinally matched grooved rollers with grooves, B, cut in their periphery parallel to each other and to their axes and separated from each other by the plane surfaces, C, which impinge against their opposites and greatly increase the lateral pressure on the dough when forced by the rotation of the rollers into the grooves.

We do not intend to confine ourselves to any fixed proportion of plane and grooved surface in the rollers we use, but will vary it as circumstances require, soft dough requiring much less pressure than hard and therefore correspondingly less separation between the grooves. Neither shall we limit ourselves to the use of longitudinally grooved rollers but will use transversely grooved rolls if convenience require.

What we claim as new and desire to secure by Letters Patent of the United States is—

The above described improved method of forming skin covered strips from a sheet of previously smooth rolled dough by passing it between a pair of grooved rollers arranged and constructed substantially as hereinbefore described with the grooves separated by portions of the plane surface of the roller.

F. C. TREADWELL, JR.
HENRY McCOLLUM.

Witnesses:
L. A. ROCKWELL,
EDWARD McCOLLUM.